United States Patent [19]

Cochran et al.

[11] Patent Number: 5,482,209
[45] Date of Patent: Jan. 9, 1996

[54] METHOD AND MEANS FOR PROGRAMMING A PROGRAMMABLE ELECTRONIC THERMOSTAT

[75] Inventors: Edward L. Cochran, Minneapolis; Stephen V. Metz, St. Paul, both of Minn.

[73] Assignee: Honeywell Inc., Minneapolis, Minn.

[21] Appl. No.: 252,038

[22] Filed: Jun. 1, 1994

[51] Int. Cl.⁶ .................................................. G05D 23/00
[52] U.S. Cl. ........................ 236/46 R; 165/11.1; 236/94
[58] Field of Search ................................. 236/94, 46 R; 165/11.1, 12

[56] References Cited

FOREIGN PATENT DOCUMENTS 0434926  7/1991  European Pat. Off. ............. 236/46 R
0194246  10/1985  Japan .................................. 236/46 R Primary Examiner—William E. Wayner
Attorney, Agent, or Firm—Ian D. MacKinnon

[57] ABSTRACT

A programmable electronic thermostat which utilizes time and temperature pairs. This thermostat utilizes a first display which displays the current status information of the thermostat which includes the current time as well as the current temperature. A second display is incorporated in which the programmed information is included. This second display is located near the programming buttons and displays program information including the day, the period, the start time and the temperature setting. By separating the displays, the thermostat is easier to program and read.

17 Claims, 3 Drawing Sheets

METHOD AND MEANS FOR PROGRAMMING A PROGRAMMABLE ELECTRONIC THERMOSTAT

BACKGROUND OF THE INVENTION

This invention relates to programmable thermostats. Specifically, it relates to the method and means by which the operator of the thermostat programs the thermostat.

Programmable thermostats have been widely used since the invention of the microprocessor. Early programmable thermostat designs are illustrated in U.S. Pat. No. 4,314,665 issued to Michael R. Levine entitled "Electronic Thermostat" and U.S. Pat. No. 4,071,745 issued to B. C. Hall entitled "Programmable Time Varying Control System and Method." These patents illustrate the use of what is commonly known as "Time and Temperature Pairs." The use of time and temperature pairs allowed for programmable thermostats to be set to varying temperatures based on the time of day. Programmable thermostats are most commonly used to set the temperature to a desired temperature while the home or office was occupied and to a secondary temperature while the home or office was unoccupied. The second temperature would be at a lower or higher temperature than the desired temperature and was utilized to conserve energy. These programmable thermostats encompass the majority of the market with respect to electronic thermostats.

With the invention of the programmable thermostat, the users were required to program these thermostats. Many of these thermostats required the user to program numerous time and temperature pairs so that this thermostat could adjust to their schedules. Most thermostats of this category required four separate time and temperature pairs for each day of the week and a second time and temperature pair for the weekend. As an example, in a home located in the midwest, in the wintertime, a user may program the thermostat to warm the home to a temperature of 68° Fahrenheit by 6:00 a.m. so that the home is warm when they rise from bed. The user will then program the thermostat to drop to 64° at 8:00 a.m. so that the furnace does not heat an empty home. The user then sets the thermostat to return the temperature to 68° at approximately 4:30 p.m. so that the home is at a comfortable temperature when the user returns. Finally, the user will set the temperature down to 66° at 11:00 p.m. to conserve energy while the users are sleeping. These time and temperature pairs are often times grouped into five-day weekday patterns with a separate Saturday and a Sunday pattern, requiring the four time and temperature pairs to be programmed for the weekday settings and reprogrammed again for the weekend settings. On more sophisticated thermostats, a separate time and temperature pair for each of the four settings may be input for each day of the week. This programming requires that a large amount of information be presented to the user in a coherent manner.

Most thermostats currently use a single display in which the day-to-day status of the thermostat is displayed and the programming information is displayed. By using a single display, users are often confused as to whether they are programming the thermostat or the thermostat is running. Due to this confusion, users often incorrectly program their thermostats or have difficulty programming the thermostat. One of the more common errors made by users is due to the thermostat's software. For instance, after remaining idle for a period of time while in the programming mode, the thermostat will return to the run mode, which leaves many users believing they have completed the programming of the thermostat. Further, many of the programming functions look similar to the day-to-day functions of the thermostat, which may confuse the user. This is because the same area of the display is used to show the current time and the program time as well as the current temperature and the programmed set point. These areas of the display are the most prominent areas. Users will often not notice smaller auxiliary labels that differentiate between programming and normal operation. The object of this invention is to provide a thermostat which is both easy to program and easy to read.

SUMMARY OF THE INVENTION

In accordance with the invention, a programmable thermostat is provided in which two separate display screens are utilized to separate the day-to-day status information of the thermostat from the programming information on the thermostat. The object of the invention is to provide a thermostat which is both physically appealing to the eye, while being significantly easier to program than the current programmable thermostats available on the market today.

The invention incorporates a standard thermostat display for the status of the thermostat. The standard display shows the time and current desired temperature. A second display area is provided in which the time and temperature programming information is provided. Specifically four separate display areas are provided in which the day of the week, the desired temperature, the period and the start time for the time and temperature pairs is displayed. The programming buttons are located directly adjacent to each display, utilizing simple up and down arrows in order to scroll to the desired programming input. By using two separate displays, the programming becomes much less complex and a programmer is able to confirm his program with less effort.

This invention separates the physical location of the thermostat programming from the balance of thermostat functions, such as manual set point control. This physical separation improves its ease-of-use. Programmable thermostats, to date, merge the display and controls for the programming with all other functions, creating the need for the user to recognize the "mode" of the device before taking an action. This design creates a "modeless" user interface with operations that are better understood and more readily learned. This advantage of a separate display is reinforced because its allows placing the thermostat keys adjacent to each of the four display areas, allowing the user to directly associate the position of the display with the respective keys.

DESCRIPTION OF THE PREFERRED EMBODIMENT

Figure 4:
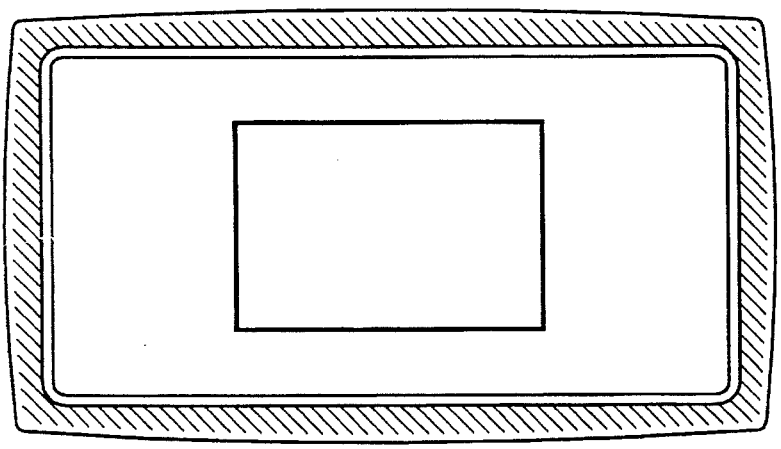
FIG. 4 illustrates the rear of the housing.
Figure 3:
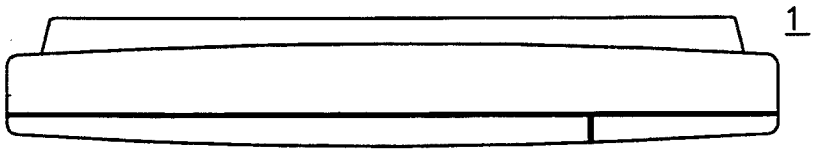
FIG. 3 is an elevation view of the top of the housing.
Figure 1:
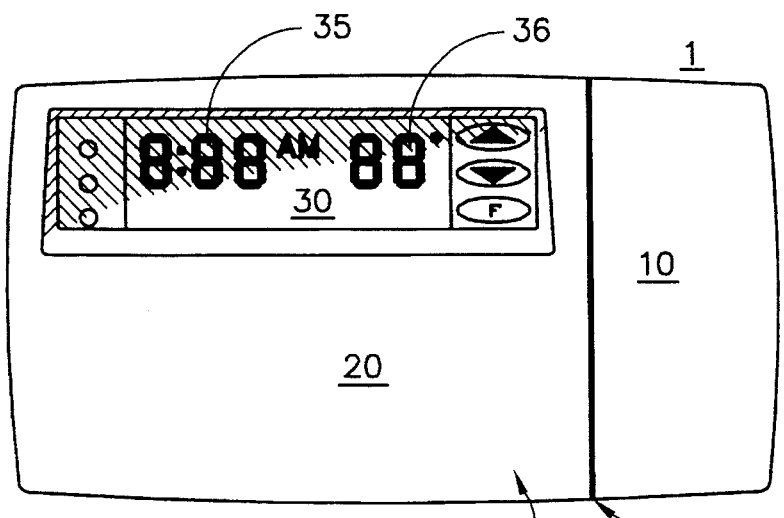
FIG. 1 is an elevation view of the front of the housing.
Figure 2:
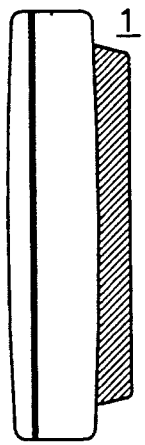
FIG. 2 is an elevation view of the right side of the housing as viewed from the front.
Figure 5:
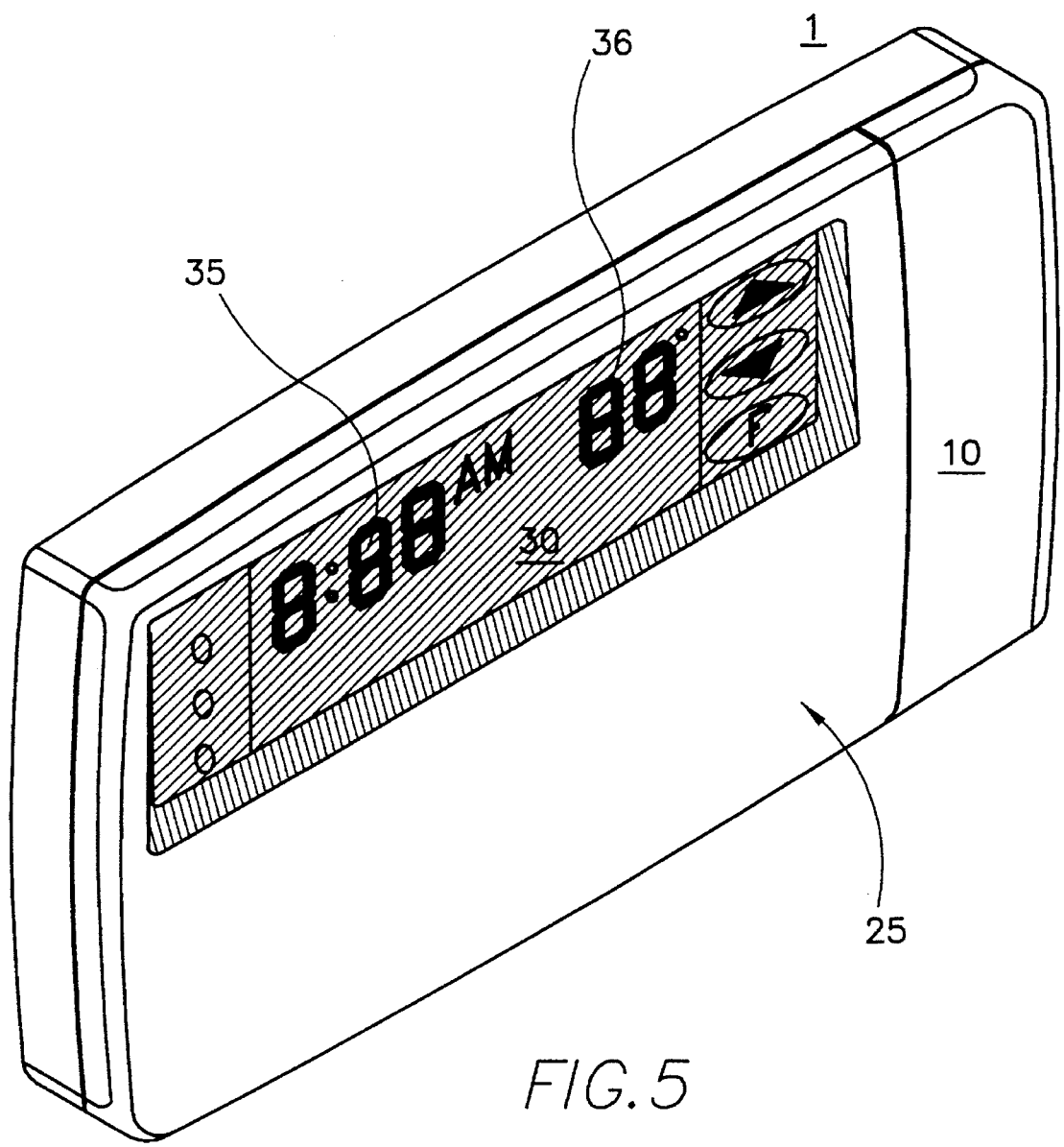
FIG. 5 is a perspective view of the housing as viewed from above and to the left.

Thermostat 1, during normal use, will appear as shown in FIGS. 1–5. Referring to FIG. 1, thermostat 1 is divided into two halves by vertical line 5, right half 10 and left half 20. Left half 20 incorporates door 25 which is better illustrated in FIG. 7. Door 25 has a recess 27 which allows a first display 30 to be visible to the user. First display 30 displays the current time 35 and the current temperature 36. This information shall be defined as the current status information of the thermostat. The current status information of a thermostat is that information which is normally displayed by the programmable electronic thermostat 1 during its normal day-to-day use. This information may also include, but is not limited to, outside temperature and the current set point temperature.

Figures 6, 7, 8:
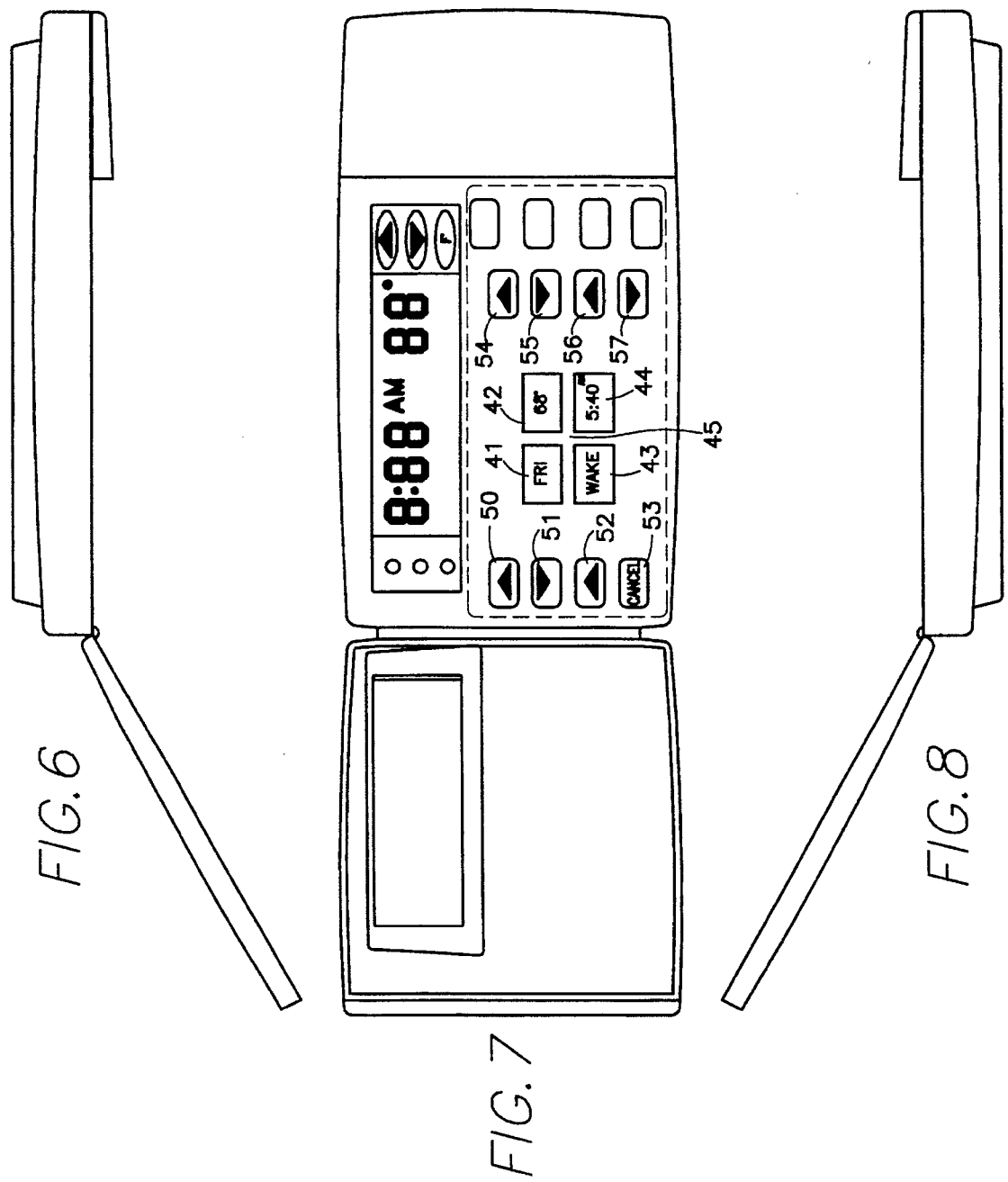
FIG. 6 illustrates the top view of the thermostat with the door in the open position.
FIG. 7 illustrates the front view of the thermostat with the door in the open position.
FIG. 8 illustrates the bottom view of the thermostat with the door in the open position.

Door 25 opens to reveal programming area 40, as illustrated in FIG. 7. Programming area 40 has a second display which is made up of displays 41, 42, 43 and 44. Display 41 displays the programming day. This is the day of the week in which the user wishes to program time and temperature pairs. Display 42 displays the set point temperature for that specific time and temperature pair. Display 43 displays the specific period, generally wake, leave, return, and sleep, or morning, afternoon, evening, night, for which that time and temperature pair is set. Display 44 displays the start time for that specific period.

In order to make programming easier, programming buttons 50, 51, 52, 53, 54, 55, 56 and 57 are located in close proximity to displays 41, 42, 43 and 44. Programming buttons 50 and 51 are located adjacent to display 41 and are utilized to scroll up and down through the days of the week so the user can select for which day they wish to modify or monitor their time and temperature pairs. Programming buttons 54 and 55 are located adjacent to display 42 in order to allow the user to increase or decrease the set point temperature accordingly. Programming buttons 52 and 53 are located adjacent to display 43. Programming button 52 allows the user to scroll through the different periods for which time and temperature pairs are set. Programming button 53 allows the user to skip a specific period by canceling that period in the program. Programming buttons 56 and 57 are located adjacent to display 44 and are utilized in setting the time for the time and temperature pairs.

As programming buttons 50 through 53 are depressed, displays 41 through 44 change accordingly. As an example, when programming button 50 is depressed, the day will increase on display 41, and displays 42 through 44 will indicate the correct information for the indicated time and temperature pair.

By locating the programming buttons with a specific function near the programmed display, the thermostat is markedly easier to use than a single display thermostat.

For the preferred embodiment, two LCD displays are utilized in creating the separate display areas. Display 30 is located near the top of the thermostat and is generally positioned in a manner which is commonly used by programmable thermostats, making it easy for the user to understand its function. Displays 41, 42, 43 and 44 are located on a separate LCD from display 30, this display being located in a generally center area of the area exposed when door 25 is open. In order to clarify even further the programming displays, a center divider 45 divides displays 41, 42, 43 and 44.

Although a single LCD display is illustrated in the preferred embodiment, a single LCD display could be utilized and, in a similar manner as divider 45 is utilized, dividers could be placed over the face of the LCD in order to separate the first display from the second display.

In order to further delineate the programming functions, shading on the housing around the displays and programming buttons can be utilized to increase the ease of use.

We claim:

1. A programmable electronic thermostat wherein said thermostat utilizes time and temperature pairs, said thermostat comprising:

a first display means displaying current status information of said thermostat;

a second display means displaying programming information for said thermostat, said programming information simultaneously indicating programming day, set point temperature, period, and start time; and programming buttons adjacent to said second display means for programming programming day, set point temperature, period, and start time.

2. The programmable electronic thermostat of claim 1 wherein said programming buttons have separate programming buttons for programming each of said programming day, set point temperature, period, and start time.

3. The programmable electronic thermostat of claim 2 wherein said second display means has four separate displays, each of said displays displaying one of said programming information comprising said programming day, set point temperature, period, and start time.

4. The programmable electronic thermostat of claim 3 wherein the current status information displayed by said first display means comprises current time and current temperature.

5. The programmable electronic thermostat of claim 4 further comprising cover means, wherein said cover means covers said second display means and said programming buttons, said cover means being removable so as to allow access to said second display means and said programming buttons.

6. The programmable electronic thermostat of claim 5 wherein said cover means is a door.

7. The programmable electronic thermostat of claim 6 wherein the current status information displayed by said first display means comprises current time and current temperature.

8. The programmable electronic thermostat of claim 2 further comprising cover means, wherein said cover means covers said second display means and said programming buttons, said cover means being removable so as to allow access to said second display means and said programming buttons.

9. The programmable electronic thermostat of claim 8 wherein said cover means is a door.

10. The programmable electronic thermostat of claim 2 wherein the current status information displayed by said first display means comprises current time and current temperature.

11. The programmable electronic thermostat of claim 1 further comprising cover means, wherein said cover means covers said second display means and said programming buttons, said cover means being removable so as to allow access to said second display means and said programming buttons.

12. The programmable electronic thermostat of claim 11 wherein said cover means is a door.

13. The programmable electronic thermostat of claim 1 wherein the current status information displayed by said first display means comprises current time and current temperature.

14. The programmable electronic thermostat of claim 1 wherein said second display means has four separate displays, each of said displays displaying one of said programming information comprising said programming day, set point temperature, period, and start time.

15. The programmable electronic thermostat of claim 14 wherein the current status information displayed by said first display means comprises current time and current temperature.

16. The programmable electronic thermostat of claim 14 further comprising cover means, wherein said cover means covers said second display means and said programming buttons, said cover means being removable so as to allow access to said second display means and said programming buttons.

17. The programmable electronic thermostat of claim 16 wherein said cover means is a door.

* * * * *